US010191159B2

(12) United States Patent
Katayama et al.

(10) Patent No.: US 10,191,159 B2
(45) Date of Patent: Jan. 29, 2019

(54) RADIATION MEASUREMENT DEVICE

(71) Applicant: MITSUBISHI ELECTRIC CORPORATION, Chiyoda-ku, Tokyo (JP)

(72) Inventors: Shohei Katayama, Tokyo (JP); Kenichi Moteki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/562,347

(22) PCT Filed: Apr. 20, 2015

(86) PCT No.: PCT/JP2015/061944
§ 371 (c)(1),
(2) Date: Sep. 27, 2017

(87) PCT Pub. No.: WO2016/170566
PCT Pub. Date: Oct. 27, 2016

(65) Prior Publication Data
US 2018/0356537 A1    Dec. 13, 2018

(51) Int. Cl.
*G01J 1/00*   (2006.01)
*G01T 1/167*  (2006.01)
*G01T 1/17*   (2006.01)

(52) U.S. Cl.
CPC .............. *G01T 1/167* (2013.01); *G01T 1/17* (2013.01)

(58) Field of Classification Search
CPC ............ G01T 7/005; G01T 1/17; G21C 17/00
See application file for complete search history.

(56) References Cited

U.S. PATENT DOCUMENTS

2015/0198723 A1*   7/2015   Katayama ............... G01T 7/005
                                                          250/336.1

FOREIGN PATENT DOCUMENTS

| JP | S 58-137326 A | 8/1983 |
| JP | S 60-209197 A | 10/1985 |
| JP | H 01-113689 A | 5/1989 |

OTHER PUBLICATIONS

International Search Report (PCT/ISA/210) dated Jun. 30, 2015, by the Japanese Patent Office as the International Searching Authority for International Application No. PCT/JP2015/061944.

(Continued)

*Primary Examiner* — Kiho Kim
(74) *Attorney, Agent, or Firm* — Buchanan Ingersoll & Rooney PC

(57) ABSTRACT

A radiation measurement device having a radiation detector, a measurement instrument provided with a signal conversion unit for carrying out signal conversion on a detection current signal output from the radiation detector, and a signal input line for supplying the detection current signal output from the radiation detector to the signal conversion unit, wherein if a test mode is selected, a test current signal is superposed on the detection current signal and supplied to the signal conversion unit through the closing of contacts and the connection of a constant-voltage source and the signal input line, and if a normal mode is selected, the constant-voltage source is connected to a point having the same potential as the signal input line and the generation of a potential difference between the contacts is prevented through the opening of the contacts and the disconnection of the constant-voltage source and signal input line.

4 Claims, 7 Drawing Sheets

(56) References Cited

OTHER PUBLICATIONS

Written Opinion (PCT/ISA/237) dated Jun. 30, 2015, by the Japanese Patent Office as the International Searching Authority for International Application No. PCT/JP2015/061944.
"Guidelines for Radiation Monitoring of Nuclear Power Plants", Articie 7.3(2), JEAg4606-2003 (2 pages).

* cited by examiner

RADIATION MEASUREMENT DEVICE

TECHNICAL FIELD

The present invention relates to a radiation measurement device used in a nuclear power plant, a nuclear fuel reprocessing plant, or the like.

BACKGROUND ART

With respect to radiation measurement devices that are placed in nuclear power plants, nuclear fuel reprocessing plants, plants utilizing radiation and the like, and at around these plants, in order to cover at the time of measuring a dose rate, etc., a wide measuring range from a usual radiation level up to a radiation level based on the accident scenario, these devices are each required to use, for example, an ionization chamber as a radiation detector, and to accurately measure a detection current signal which is generated by the action of radiation in the ionization chamber and is extremely small, widely ranging from an order of $10^{-13}$ A (ampere) to an order of $10^{-7}$ A. In order to measure such an extremely small current, the detection current signal is converted, in a state where insulation is highly maintained, into an output signal resistant to noise, which is then measured, and the measured value is outputted after converted into an engineering value such as a dose rate, etc. (see, for example, Patent Documents 1, 2)

Further, the radiation measurement devices are required to fulfill the requirement of "when there is no radiation source capable of checking the detector, integrity of the measuring system shall be confirmed in such a manner that a simulation signal is inputted as an input to the electronic circuit in the test mode" described in Guideline for Radiation Monitoring of Nuclear Power Plants, JEAG4606-2003 (see, for example, Non-Patent Document 1).

CITATION LIST

Patent Document

Patent Document 1: Japanese Patent Application Laid-open No. H01-113689 (Page 3, Left-upper Column, Line 12 to Right-upper Column, Line 11; FIG. 1)
Patent Document 2: Japanese Patent Application Laid-open No. S58-137326 (Page 2, Right-lower Column, Line 11 to Page 3, Left-upper Column, Line 18; FIG. 2)

Non-Patent Document

Non-Patent Document 1: Guideline for Radiation Monitoring of Nuclear Power Plants, JEAG4606-2003 (Article 7.3 (2))

SUMMARY OF THE INVENTION

Problems to be Solved by the Invention

However, according to the conventional radiation measurement device, extremely-small and wide-range detection current signals are targeted for measurement, so that, in order to perform measurement with excellent accuracy, in particular, in a region of the range near the lower limit, it is required to reduce a leakage current that is intruded into the detection current in a period from outputting of the radiation detector until inputting to a metering instrument. Thus, when comparison is made between the cases with and without such a test function, there is a problem that the leakage current increases more largely in association with the addition of the test function. In addition, there is a problem that, due to a conditional change or temporal change in environment, the insulated state of the interface portion between an input switching unit and a test-current generation unit in the metering instrument changes, resulting in variation of the leakage current.

The present invention has been made to solve the problems as described above, and an object thereof is to provide a radiation measurement device which can prevent, if the test function is installed therein, the leakage current intruded into the detection current signal, from increasing due to that function, to thereby perform measurement with excellent accuracy in a region of the range near the lower limit.

Means for Solving the Problems

A radiation measurement device of the invention is characterized by comprising: a radiation detector that detects radiation to thereby output a detection current signal; a metering instrument that has: a signal conversion unit for performing signal conversion of the detection current signal; a signal processing unit for processing a signal converted by the signal conversion unit; a calculation unit for calculating an engineering value from a value processed by the signal processing unit; an operation unit which can operationally select a normal mode or a test mode; and a test-current generation unit for generating a test current signal simulated for the detection current signal, and then inputting to the detection current signal, the test current signal to be superimposed thereon; and a signal input line that connects the radiation detector and the metering instrument to each other, and has an input terminal from the test-current generation unit; wherein, when the test mode is operationally selected, the test current signal is superimposed on the detection current signal by the test-current generation unit, and then they are subjected to signal conversion by the signal conversion unit, and when the normal mode is operationally selected, only the detection current signal is subjected to signal conversion by the signal conversion unit.

Effect of the Invention

According to the invention, when the normal mode is operationally selected, only the detection current signal is subjected to signal conversion, so that it is possible not only to easily confirm the integrity of radiation monitoring by using the test current, but also to guard the detection current signal to thereby prevent a leakage current from intruding thereinto. This makes it possible to perform stable measurement with high accuracy even in a region of the range near the lower limit.

MODES FOR CARRYING OUT THE INVENTION

Embodiment 1

Figure 1:
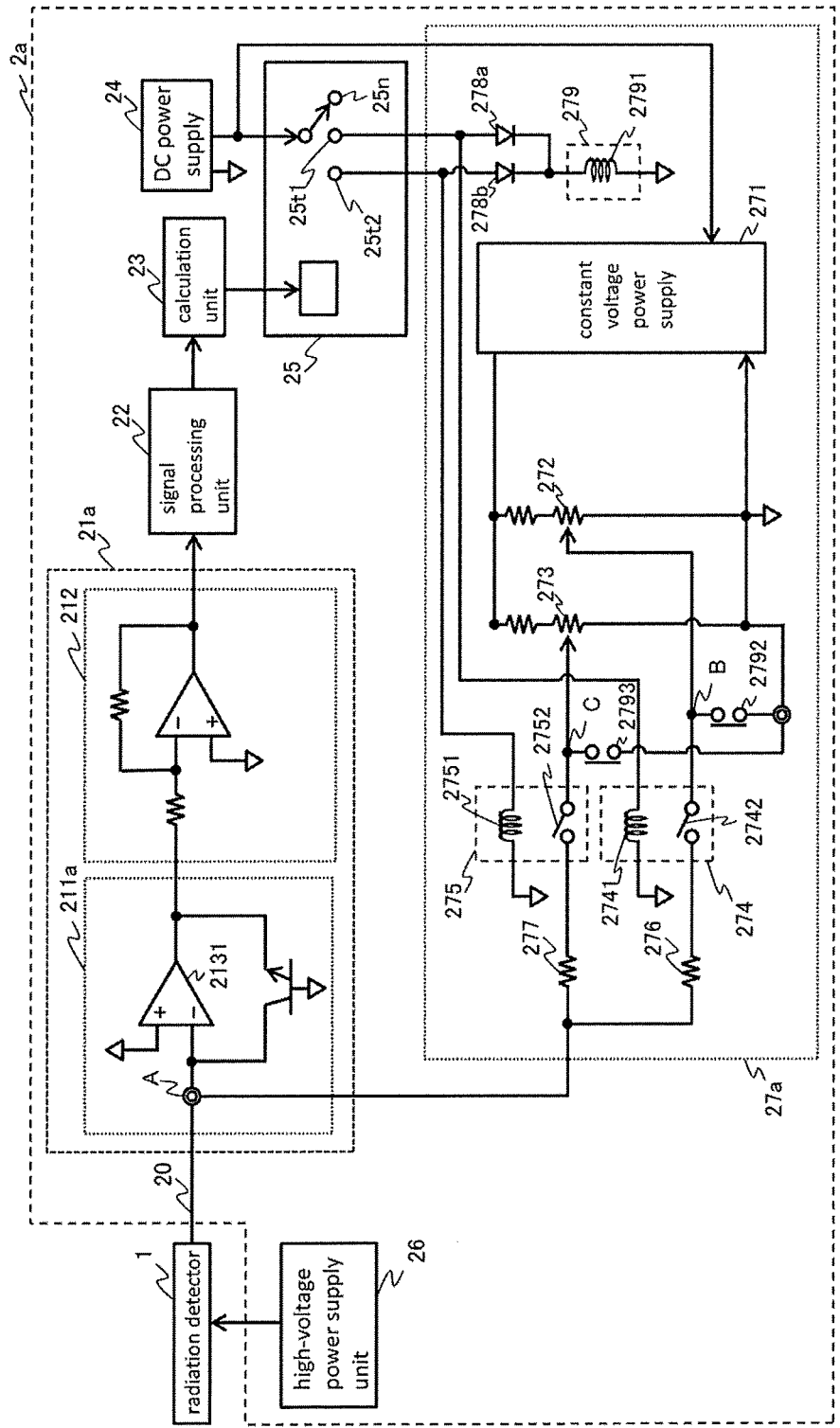
FIG. 1 is a circuit diagram showing a configuration of a radiation measurement device according to Embodiment 1 of the invention.

FIG. 1 is a diagram showing a configuration of a radiation measurement device according to Embodiment 1 of the invention. As shown in FIG. 1, the radiation measurement device is configured with a radiation detector 1 and a metering instrument 2a. The radiation detector 1 detects radiation to thereby output a detection current signal. The metering instrument 2a has: a signal input line 20; a signal conversion unit 21a; a signal processing unit 22; a calculation unit 23; a DC power supply 24; a display/operation unit 25; a high-voltage power supply unit 26; and a test-current generation unit 27.

In the signal conversion unit 21a, a log I/V conversion unit 211a imports the detection current signal outputted from the radiation detector 1 through the signal input line 20, and then converts it into a voltage signal proportional to a logarithm of its current value, and an inverting amplifier 212 outputs that voltage signal while inverting and amplifying it. Although the detection current signal is extremely small as being in an order of $10^{-13}$ A near the lower limit of the measuring range, because it is subjected to signal conversion and is then amplified as described above, its noise immunity is enhanced. The signal processing unit 22 measures the thus-amplified voltage signal, the calculation unit 23 converts the thus-measured value into an engineering value such as a dose rate, etc., and the display/operation unit 25 displays the engineering value. In addition to functioning to display the engineering value, the display/operation unit 25 can operationally select a normal mode for performing a normal measurement or a test mode for confirming the integrity of the metering instrument 2a, according to button operation on its display screen, for example.

The high-voltage power supply unit 26 supplies a high voltage to the radiation detector 1 to thereby cause it to detect radiation. The test-current generation unit 27a, when a DC voltage is supplied from the DC power supply 24 thereto, generates a test current signal, and according to a selective switching operation in the display/operation unit 25, the test-current generation unit, when in the test mode, introduces to the detection current signal, a test current to be superimposed thereon, and when in the normal mode, interrupts said introducing and diverts the test current signal to a zero-voltage line having a potential that is the same as the potential for the detection current signal.

Next, operations of the radiation measurement device according to Embodiment 1 of the invention will be described. The operations of the radiation measurement device are classified into: generation of the test current in the test-current generation unit 27a; introduction of the test current at the time of the test mode; and prevention of leakage-current intrusion from the test-signal generation unit 27a to the detection current signal at the time of the normal mode, so that description will be made about their respective operations.

As for a test-mode switching operation, the display/operation unit 25 can select, for example, either one of a test mode 25t1 for Test 1 and a test mode 25t2 for Test 2 that use test-current values different to each other. In the test-current generation unit 27a, a constant voltage power supply 271, when a DC voltage is supplied from the DC power supply 24 thereto, generates and outputs a constant voltage. The constant voltage is adjusted to be stepped down using a variable resistance 272 corresponding to Test 1. Likewise, the constant voltage as an output of the constant voltage power supply 271 is adjusted to be stepped down using a variable resistance 273 corresponding to Test 2.

When Test 1 is selected (test mode 25t1 is selected), a coil 2741 of a first switching relay 274 is excited, so that a contact 2742 is inverted from "Open" to "Closed" and a voltage adjusted by the variable resistance 272 is supplied to a high resistance 276 connected to the signal input line 20. Thus, the test current for Test 1 is generated and introduced into the signal input line 20 to thereby be superimposed on the detection signal current. When Test 2 is selected (test mode 25t2 is selected), a coil 2751 of a second switching relay 275 is excited, so that a contact 2752 is inverted from "Open" to "Closed" and a voltage adjusted by the variable resistance 273 is supplied to a high resistance 277 connected to the signal input line 20. Thus, the test current for Test 2 is generated and introduced into the signal input line 20 to thereby be superimposed on the detection signal current.

The value of the test current to be introduced in Test 1 is adjusted using, as a rough standard, such a value that allows the detection current signal at a background level to be neglected, while the value of the test current in Test 2 is adjusted using, as a rough standard, a value that is two or more orders of magnitude greater than that in Test 1. Note that the first switching relay 274 and the second switching relay 275 are relays in which the respective contacts 2742, 2752 are enclosed in their airtight containers, thus capable of highly maintaining insulation in an order of $10^{15}\Omega$, for which reed relays that are easily commercially available may be applied.

When, in the display/operation unit 25, Normal is selected (normal mode 25n is selected) from a state in which Test 1 is selected (test mode 25t1 is selected), the coil 2741 of the first switching relay 274 becomes "Unexcited", so that the contact 2742 is inverted from "Closed" to "Open", and further, a coli 2791 of a reference-potential connection relay 279 becomes "Unexcited" from "Excited", so that the contact 2792 is inverted from "Open" to "Closed" and thus, in the contact 2742 of the first switching relay 274 that becomes "Open", its side toward the variable resistance 272 is connected to zero voltage that is the same as the potential of the signal input line 20, to thereby divert the test current for Test 1 to zero voltage. Likewise, when, in the display/operation unit 25, Normal is selected (normal mode 25n is selected) from a state in which Test 2 is selected (test mode 25t2 is selected), the coil 2751 of the second switching relay 275 becomes "Unexcited" from "Excited", so that the contact 2752 is inverted from "Closed" to "Open", and further, the coil 2791 of the reference-potential connection relay 279 becomes "Unexcited" from "Excited", so that the contact 2793 is inverted from "Open" to "Closed" and thus, in the contact 2752 of the second switching relay 275 that becomes "Open", its side toward the variable resistance 273 is connected to zero voltage that is the same as the potential of the signal input line 20, to thereby divert the test current for Test 2 to zero voltage.

The reference-potential connection relay 279 operates as a load of the DC power supply 24 through the parallel connection of a diode 278a corresponding to Test 1 (test mode 25t1) and a diode 278b corresponding to Test (test mode 25t1), and in either case of selecting Test (test mode 25t1) or Test 2 (test mode 25t2), the coil 2791 is excited, so that the contacts 2792, 2793 become "Open", whereas in the case of Normal (normal mode 25n), when the coil 2791 becomes "Unexcited", the contacts 2792, 2793 become "Closed". Accordingly, respective connection terminal B and connection terminal C of the contact 2742 and contact 2752 become a potential (zero V) that is the same as that at the input terminal A from the test-current generation unit 27a to the signal input line 20. This makes it possible to prevent intrusion of the leakage current, to thereby perform stable measurement with high accuracy even near the lower limit of the range. Note that, with respect to the reference-potential connection relay 279, it is not required that its contact is highly insulative like the contact 2742 of the first switching relay 274 and the contact 2752 of the second switching relay 275, so that a general-purpose relay may be applied therefor.

As described above, in the radiation measurement device according to Embodiment 1 of the invention, the test-current generation unit 27a is provided and, when the test mode 25t1 or 25t2 is selected, through the contact 2742 or 2752 inverted from "Open" to "Closed" in the first switching relay 274 or second switching relay 275 operating in response to that mode, a voltage resulting from adjusting the constant voltage to be stepped down using the high resistance connected to the signal input line 20 is applied, so that the test current is introduced into the signal input line 20 to be superimposed on the detection current signal;

whereas, when the normal mode is selected, the introduction of the test current is interrupted by the contact 2742 or 2752 inverted from "Closed" to "Open" in the first switching relay 274 or second switching relay 275 operating in response to that mode, so that, in the contacts 2742 and 2752 inverted to "Open", their sides toward the variable resistances are connected to zero voltage that is the same as the potential at the input terminal A of the signal input line 20, by using the contacts 2792, 2793 inverted from "Open" to "Closed" in the reference-potential connection relay 279 operating also in response to that mode, to thereby divert the test current to zero voltage, and thus, each potential at connection terminals B, C where the test current is interrupted at the time of the normal mode, is fixed to that same potential, to thereby prevent a potential difference from occurring. Thus, it is possible not only to easily confirm the integrity of radiation monitoring by using the test current, but also to guard the detection current signal to thereby prevent a leakage current from intruding thereinto. This makes it possible to perform stable measurement with high accuracy even in a region of the range near the lower limit.

Embodiment 2

In Embodiment 1, the signal input line 20 of the signal conversion unit 21a is at zero voltage, whereas, in Embodiment 2, description will be made about a case where an offset is adjustable so that the potential of the signal input line 20 is other than zero voltage.

Figure 2:
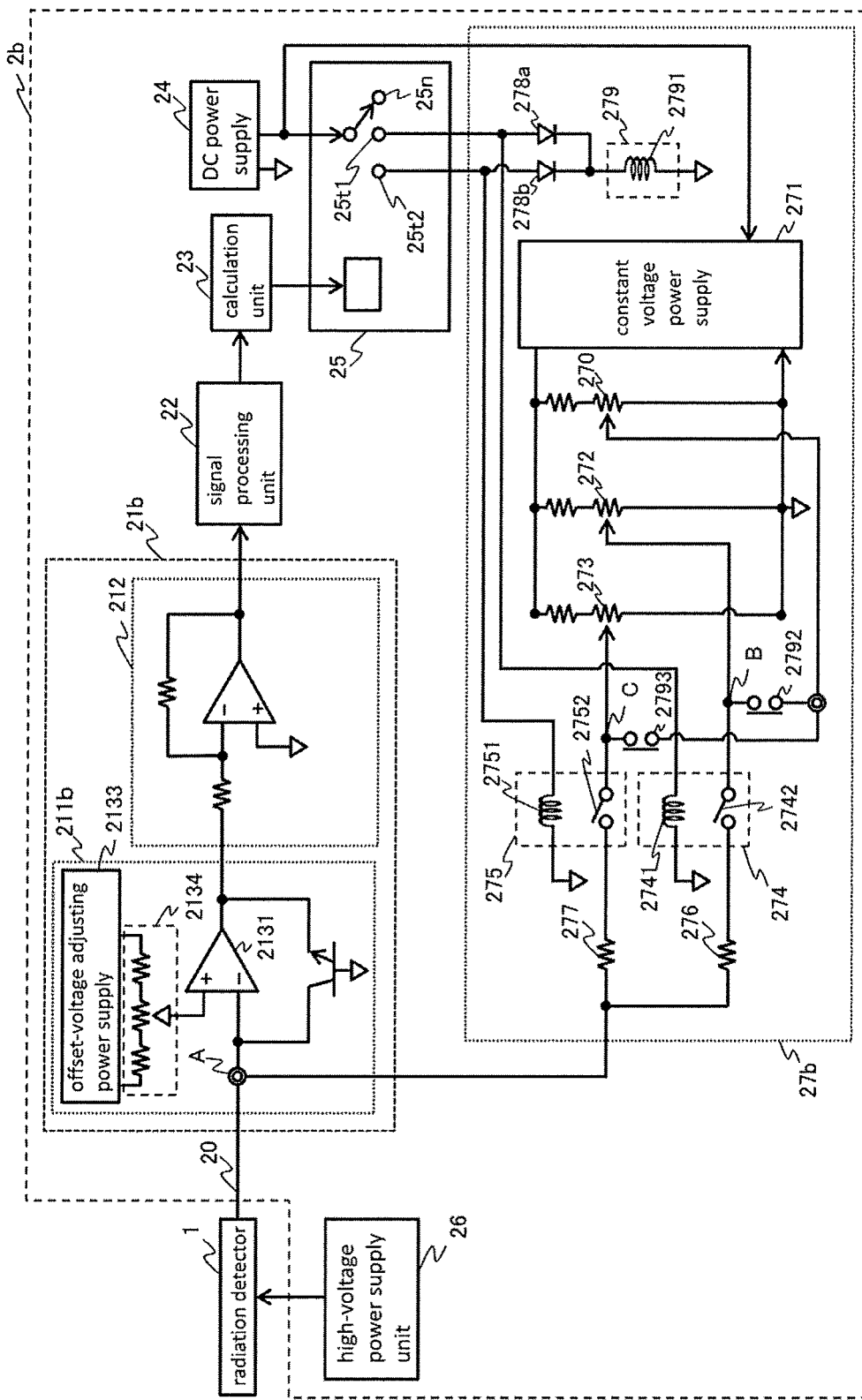
FIG. 2 is a circuit diagram showing a configuration of a radiation measurement device according to Embodiment 2 of the invention.

FIG. 2 is a diagram showing a configuration of a radiation measurement device according to Embodiment 2 of the invention. As shown in FIG. 2, in a metering instrument 2b, a signal conversion unit 21b provided with an offset-voltage adjusting power supply 2133 is included. A test-current generation unit 27b can adjust an offset so that the potential of the signal input line 20 can be set to a potential other than zero voltage. In the test-current generation unit 27b, when the normal mode is selected, the constant voltage as an output of the constant voltage power supply 271 is adjusted using a variable resistance 270 to be stepped down to a reference potential that is the same as the potential of the signal input line 20, and in the contacts 2742 and 2752 one of which is inverted from "Closed" to "Open" in the first switching relay 274 or second switching relay 275 operating in response to that mode, their sides toward the variable resistances are each connected to the reference potential that is the same as the potential of the signal input line 20, by using the contacts 2792 and 2793 inverted from "Open" to "Closed" in the reference-potential connection relay 279 operating also in response to that mode, to thereby divert the test current to the reference potential. The other configuration is similar to in the radiation measurement device of Embodiment 1, so that its description is omitted here.

With this configuration, even though the potential of the signal line 20 of the signal conversion unit 21b is other than zero voltage, when the normal mode is selected, the potentials at the respective connection terminal B and connection terminal C of the contact 2742 and contact 2752 become the same as the potential at the input terminal A from the test-current generation unit 27b to the signal input line 20. Thus, it is possible to prevent intrusion of a leakage current, to thereby perform stable measurement with high accuracy even near the lower limit of the range.

As described above, in the radiation measurement device according to Embodiment 2 of the invention, the test-current generation unit 27b is provided and, when the test mode 25t1 or 25t2 is selected, through the contact 2742 or 2752 inverted from "Open" to "Closed" in the first switching relay 274 or second switching relay 275 operating in response to that mode, a voltage resulting from adjusting the constant voltage to be stepped down using the high resistance connected to the signal input line 20 is applied, so that the test current is introduced into the signal input line 20 to be superimposed on the detection current signal;

whereas, when the normal mode is selected, with respect to the potential other than zero voltage and given by the offset-voltage adjusting power supply 2133, the constant voltage as an output of the constant voltage power supply 271 is adjusted to be stepped down, using the variable resistance 270 of the test-current generation unit 27b, to the reference potential that is the same as the potential of the signal input line 20, so that the test current is connected to a potential that is the same as the potential at the input terminal A of the signal line 20, so as to be diverted to the reference potential, and thus, each potential at the connection terminals B, C where the test current is interrupted at the time of the normal mode, is fixed to that same potential, to thereby prevent a potential difference from occurring. Accordingly, even though the potential of the signal line of the signal conversion unit is other than zero voltage, it is possible not only to easily confirm the integrity of radiation monitoring by using the test current, but also to guard the detection current signal to thereby prevent a leakage current from intruding thereinto. This makes it possible to perform stable measurement with high accuracy even in a region of the range near the lower limit.

Embodiment 3

In Embodiment 1 and Embodiment 2, such cases have been described in which the signal conversion units 21a, 21b each import the detection current signal and then convert it into a voltage signal proportional to a logarithm of its current value, and the voltage signal after being amplified is measured by the signal processing unit 22, whereas, in Embodiment 3, description will be made about a case where the detection current signal outputted from the radiation detector 1 is converted into a rectangular-wave pulse signal, which is then measured by a signal processing unit.

Figure 3:
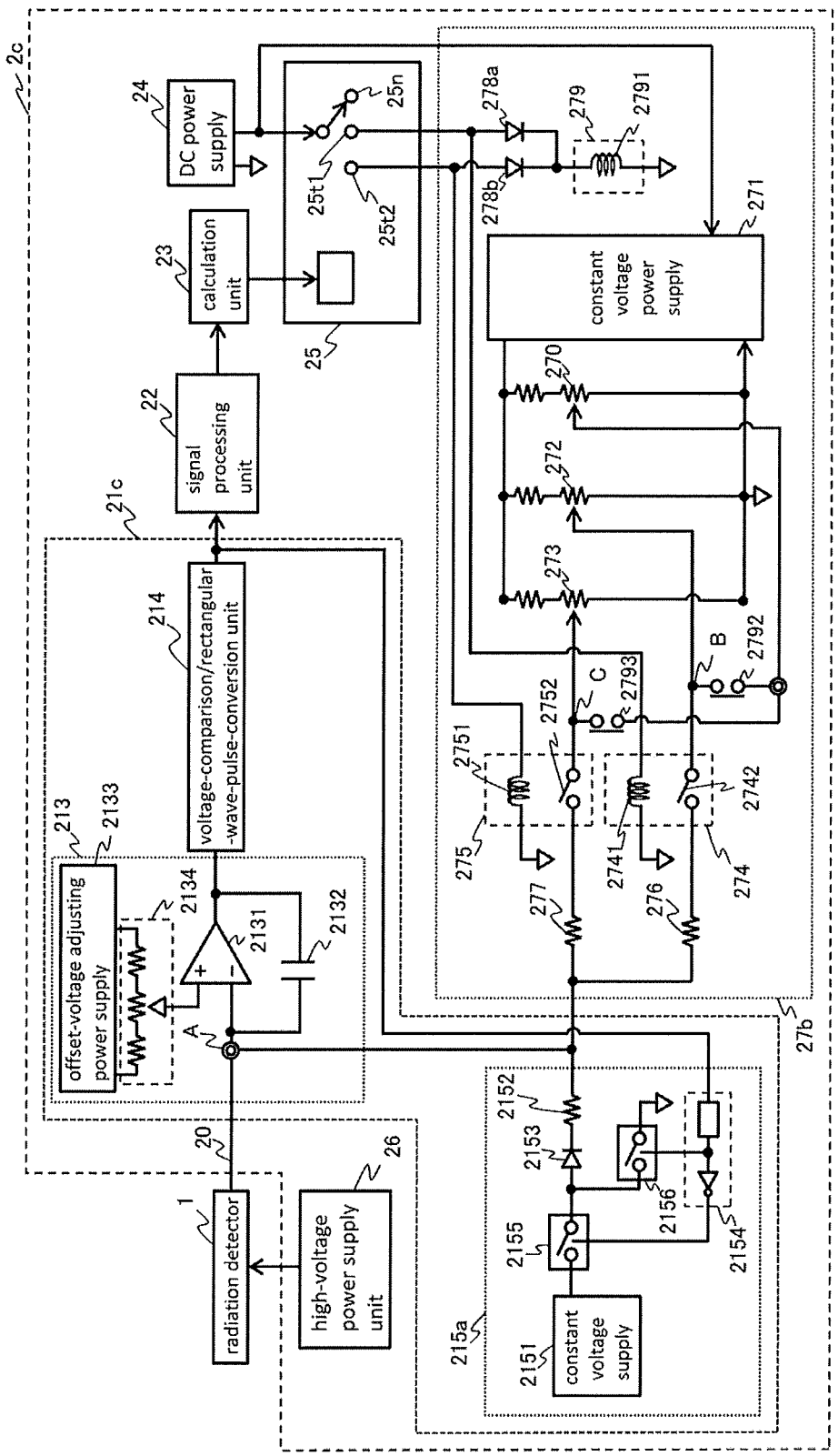
FIG. 3 is a circuit diagram showing a configuration of a radiation measurement device according to Embodiment 3 of the invention.

FIG. 3 is a diagram showing a configuration of a radiation measurement device according to Embodiment 3 of the invention. As shown in FIG. 3, in a signal conversion unit 21c, an electric-charge integration unit 213 integrates the electric charges of the detection current signal to thereby converts them into a voltage that increases in proportion to the electric charges; a voltage-comparison/rectangular-wave-pulse-conversion unit 214 outputs a one-shot-like rectangular wave pulse when the voltage reaches a setup value; and an electric-charge discharging unit 215a discharges the electric charges integrated in the electric-charge integration unit 213 during when the rectangular wave pulse is outputted.

In the electric-charge discharging unit 215a, a constant voltage supply 2151 outputs a constant voltage; a fixed resistance 2152 converts the constant voltage into a constant current to thereby use it as a discharging current for the electric-charge integration unit 213; and a diode 2153 allows the discharging current to flow in the forward direction to thereby prevent a current from flowing out in the backward direction from the electric-charge integration unit 213. A first semiconductor switch 2155 is connected at its one end to the output of the constant voltage supply 2151, and connected at the other one end to the anode of the diode 2153. A second semiconductor switch 2156 is connected at its one end to the anode of the diode 2153, and connected at the other one end to zero voltage. The fixed resistance 2152 is connected at its one end to the cathode of the diode 2153, and connected at the other one end to the signal input line 20. During importing the rectangular-wave pulse from the voltage-comparison/rectangular-wave-pulse-conversion unit 214, the electric-charge discharging unit 215a causes the first semiconductor switch 2155 to be closed and causes the second semiconductor switch 2156 to be open, to introduce the discharging current to the signal input line 20 through the diode 2153 and the fixed resistance 2152 to thereby discharge the electric charges integrated in the electric-charge integration unit 213. During importing no rectangular-wave pulse, the electric-charge discharging unit causes the first semiconductor switch 2155 to be open, to thereby interrupt the discharging current, and causes the second semiconductor switch 2156 to be closed, to thereby fix the potential of the anode of the diode 2153 to zero voltage.

Figure 4A:
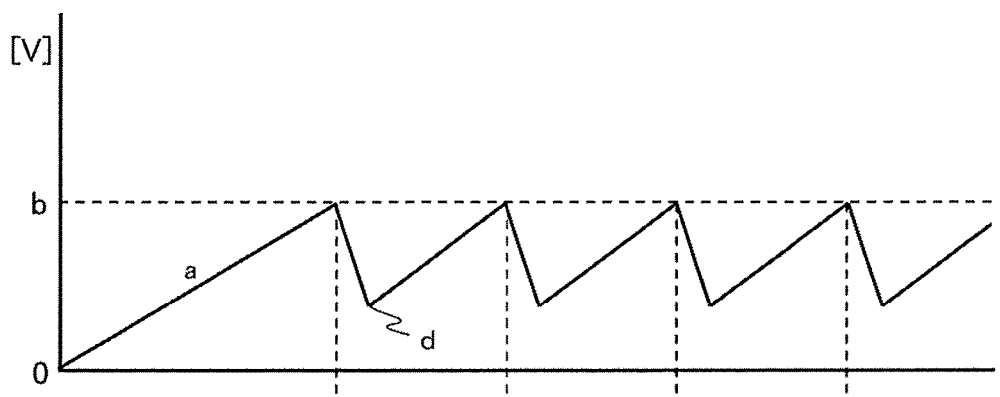
FIG. 4A and FIG. 4B are diagrams showing signals converting operation by the radiation measurement device according to Embodiment 3 of the invention.
Figure 4B:
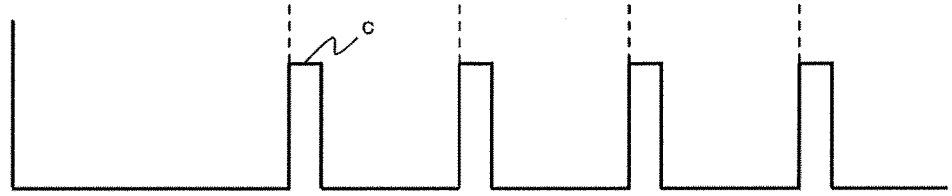

FIG. 4A and FIG. 4B are diagrams showing signals operation by the signal conversion unit 21c, in which indicated by "a" is a voltage value of the voltage that is converted from the integrated electric charges of the detection current signal and that increases in proportion to the electric charges. When the voltage value reaches a setup value "b", the integrated electric charges are discharged and then, at a level "d" that corresponds to a discharged amount determined by the constant current for discharging and the width of the rectangular-wave pulse, charging is restarted. Note that the discharged amount is set so that "d" does not fall below zero voltage even if a level of "a" drifts.

With respect to a convertor like the signal conversion unit 21c, which converts a detection current to a rectangular-wave pulse signal that is repetitive with a frequency in proportion to the current value, a leakage current after compensation of the current in the signal input line 20, a positive leakage current generated by the electric-charge discharging unit 215a, etc. and a negative leakage current generated by an electric-charge integration capacitor 2132, etc., is included in the objects of offset adjustment and is thus adjusted by the offset-voltage adjusting power supply.

Even in this case, like in Embodiment 2, in the test-current generation unit 27b of a metering instrument 2c, when the normal mode is selected, with respect to the potential other than zero voltage and given by the offset-voltage adjusting power supply 2133, the constant voltage as an output of the constant voltage power supply 271 is adjusted to be stepped down, using the variable resistance 270, to the reference potential that is the same as the potential of the signal input line 20, and in the contacts 2742 and 2752 one of which is inverted from "Closed" to "Open" in the first switching relay 274 or second switching relay 275 operating in response to that mode, their sides toward the variable resistances are each connected to the reference potential that is the same as the potential of the signal input line 20, by using the contacts 2792 and 2793 inverted from "Open" to "Closed" in the reference-potential connection relay 279 operating also in response to that mode, to thereby divert the test current to the reference potential. The other configuration is similar to in the radiation measurement devices of Embodiment 1 and Embodiment 2, so that its description is omitted here.

With this configuration, even though the potential of the signal line 20 of the signal conversion unit 21c is other than zero voltage, when the normal mode is selected, the potentials at the respective connection terminal B and connection terminal C of the contact 2742 and contact 2752 become the same as the potential at the input terminal A from the test-current generation unit 27b to the signal input line 20. Thus, it is possible to prevent intrusion of a leakage current, to thereby perform stable measurement with high accuracy even near the lower limit of the range.

As described above, in the radiation measurement device according to Embodiment 3 of the invention, the test-current generation unit 27b is provided and, even though the signal conversion unit 21c for converting the detection current signal into a rectangular-wave pulse signal is used, when the test mode 25t1 or 25t2 is selected, through the contact 2742 or 2752 inverted from "Open" to "Closed" in the first switching relay 274 or second switching relay 275 operating in response to that mode, a voltage resulting from adjusting the constant voltage to be stepped down using the high resistance connected to the signal input line 20 is applied, so that the test current is introduced into the signal input line 20 to be superimposed on the detection current signal;

whereas, when the normal mode is selected, with respect to the potential other than zero voltage and given by the offset-voltage adjusting power supply 2133, the constant voltage as an output of the constant voltage power supply 271 is adjusted to be stepped down, using the variable resistance 270 of the test-current generation unit 27b, to the reference potential that is the same as the potential of the signal input line 20, so that the test current is connected to a potential that is the same as the potential at the input terminal A of the signal line 20, so as to be diverted to the reference potential, and thus, each potential at the connection terminals B, C where the test current is interrupted at the time of the normal mode, is fixed to that same potential, to thereby prevent a potential difference from occurring. Accordingly, even though the detection current signal is converted into a rectangular-wave pulse signal, it is possible not only to easily confirm the integrity of radiation monitoring by using the test current, but also to guard the detection current signal to thereby prevent a leakage current from intruding thereinto. This makes it possible to perform stable measurement with high accuracy even in a region of the range near the lower limit.

Embodiment 4

In Embodiment 3, such a case has been described where the leakage current of the electric-charge discharging unit 215a is adjusted by the signal conversion unit 21c, whereas, in Embodiment 4, description will be made about a case where, for the electric-charge discharging unit, boosting adjustment up to a reference potential is also done by the test-current generation unit.

Figure 5:
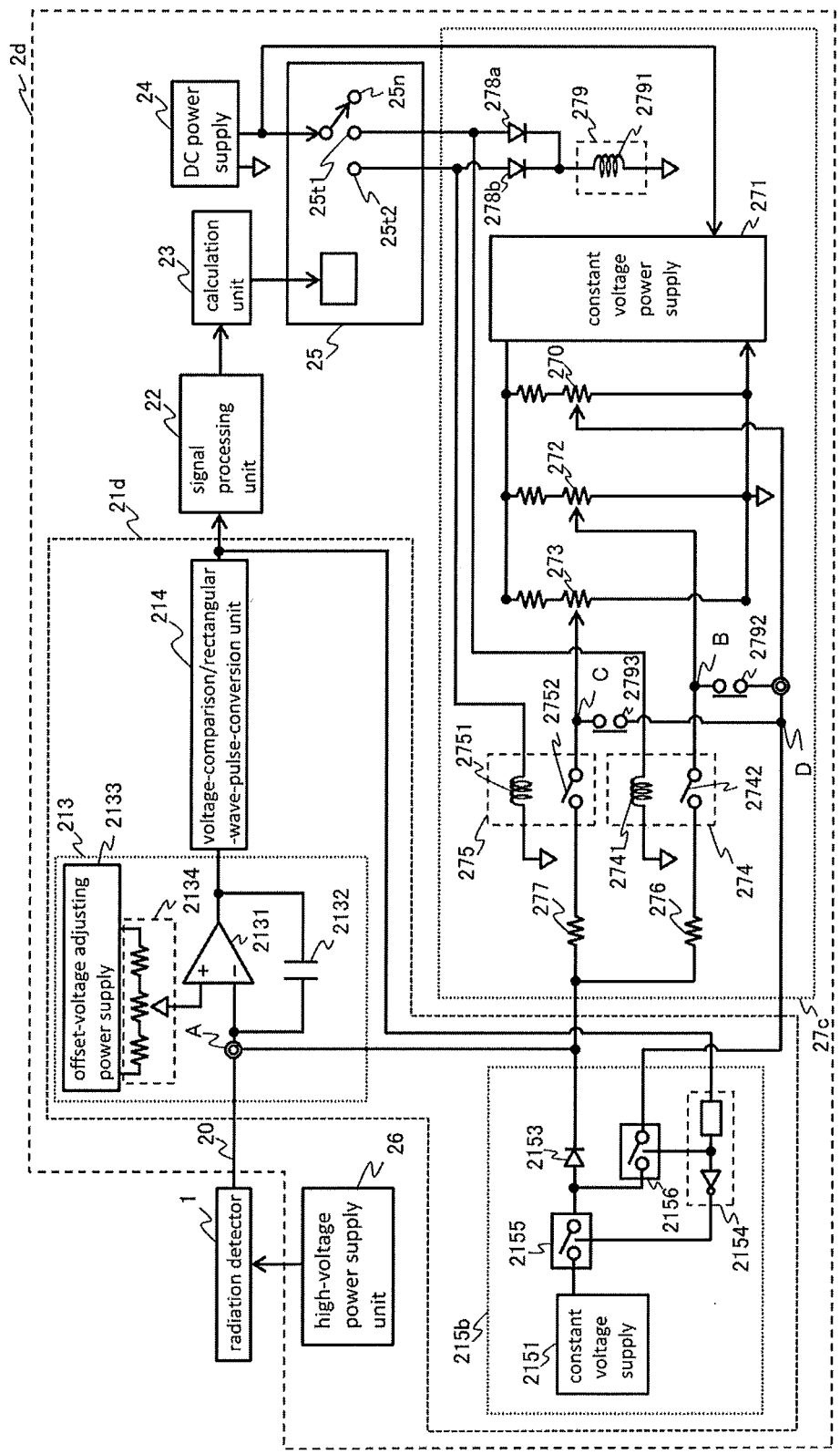
FIG. 5 is a circuit diagram showing a configuration of a radiation measurement device according to Embodiment 4 of the invention.

FIG. 5 is a diagram showing a configuration of a radiation measurement device according to Embodiment 4 of the invention. As shown in FIG. 5, in an electric-charge discharging unit 215b of a metering instrument 2d, one end of the second semiconductor switch 2156 is connected to the anode of the diode 2153, and the other one end is connected to the reference potential that is the same as the potential of the signal input line 20 of the test-current generation unit 27c, so that the voltage difference between the anode and the cathode of the diode 2153 is eliminated at the time the electric charges are integrated by the electric-charge integration unit 213, to thereby further prevent a leakage current from intruding into the signal input line 20. The other configuration is similar to in the radiation measurement device of Embodiment 3, so that its description is omitted here.

With this configuration, even though the potential of the signal line 20 of a signal conversion unit 21d is other than zero voltage, when the normal mode is selected, the potentials at the respective connection terminal B and connection terminal C of the contact 2742 and contact 2752 become the same as the potential at the input terminal A from a test-current generation unit 27c to the signal input line 20 and, not only that, the potential at a connection terminal D of the second semiconductor switch 2156 becomes the same as the potential at the input terminal A. Thus, an effect of preventing a leakage current from intruding into the signal input line 20 from the electric-charge discharging unit 215b in the signal conversion unit 21d, is added to an effect similar to in Embodiment 3 of preventing a leakage current from intruding into the signal input line 20 from the test-current generation unit 27c, so that it is possible to perform more stable measurement with high accuracy near the lower limit of the range.

As described above, in the radiation measurement device according to Embodiment 4 of the invention, the test-current generation unit 27c is provided and, even though the signal conversion unit 21d for converting the detection current signal into a rectangular-wave pulse signal is used, when the test mode 25t1 or 25t2 is selected, through the contact 2742 or 2752 inverted from "Open" to "Closed" in the first switching relay 274 or second switching relay 275 operating in response to that mode, a voltage resulting from adjusting the constant voltage to be stepped down using the high resistance connected to the signal input line 20 is applied, so that the test current is introduced into the signal input line 20 to be superimposed on the detection current signal;

whereas, when the normal mode is selected, with respect to the potential other than zero voltage and given by the offset-voltage adjusting power supply 2133, the constant voltage as an output of the constant voltage power supply 271 is adjusted to be stepped down, using the variable resistance 270 of the test-current generation unit 27c, to the reference potential that is the same as the potential of the signal input line 20, so that the test current is connected to a potential that is the same as the potential at the input terminal A of the signal line 20, so as to be diverted to the reference potential, and thus, each potential at the connection terminals B, C where the test current is interrupted at the time of the normal mode and a connection terminal D of the second semiconductor switch 2156 that is closed, is fixed to that same potential, to thereby prevent a potential difference from occurring. Accordingly, even though the detection current signal is converted into a rectangular-wave pulse signal, it is possible not only to easily confirm the integrity of radiation monitoring by using the test current, but also to guard the detection current signal to thereby prevent a leakage current from intruding thereinto. This makes it possible to perform more stable measurement with high accuracy even in a region of the range near the lower limit.

Embodiment 5

In Embodiment 5, such a case where a coaxial cable is used as the signal input line will be described.

Figure 6:
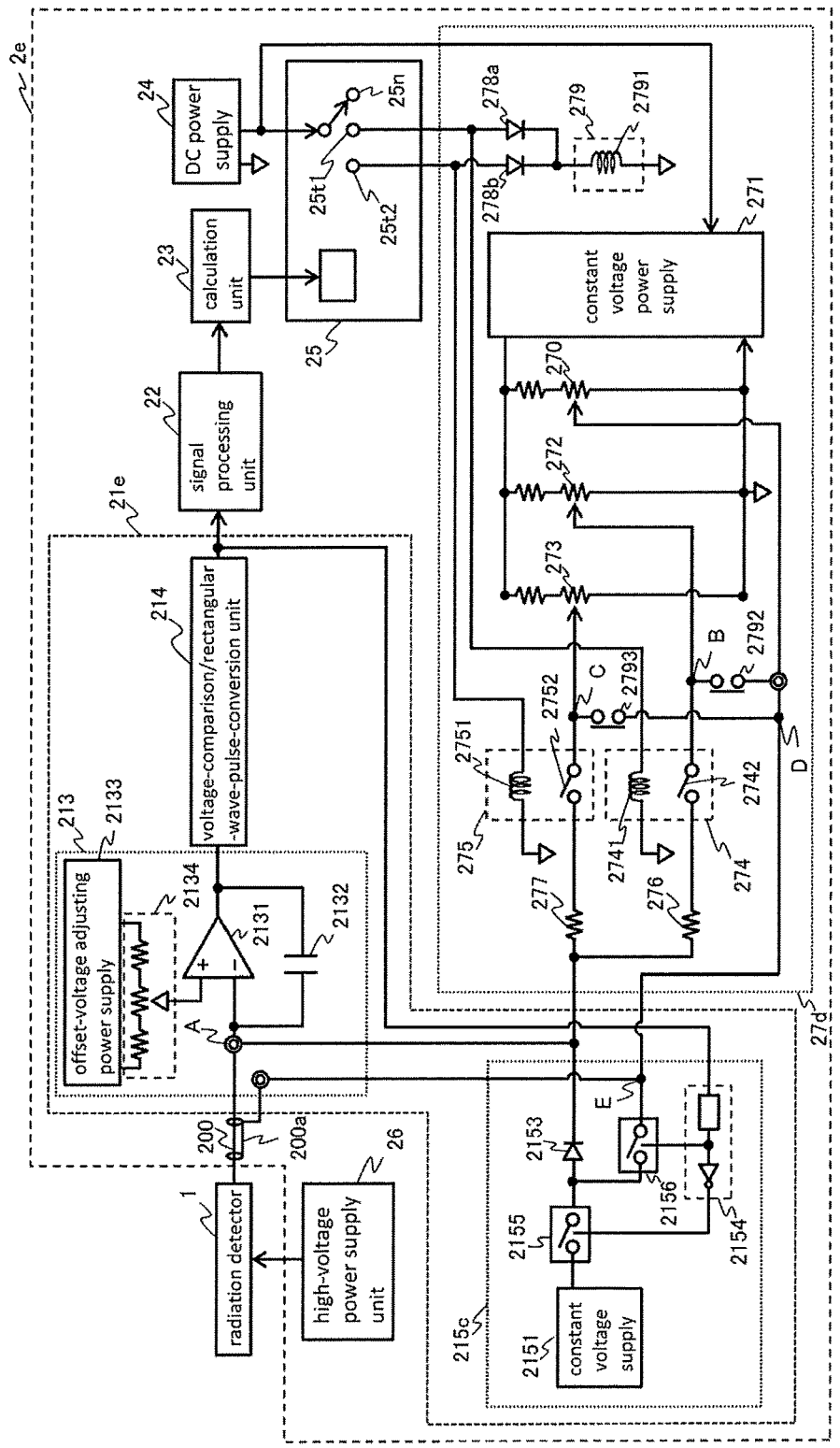
FIG. 6 is a circuit diagram showing a configuration of a radiation measurement device according to Embodiment 5 of the invention.

FIG. 6 is a diagram showing a configuration of a radiation measurement device according to Embodiment 5 of the invention. As shown in FIG. 6, in a signal conversion unit 21e of a metering instrument 2e, a coaxial cable 200 is provided as the signal input line of the detection current signal from the radiation detector 1 to the metering instrument 2e. The coaxial cable 200 is connected at its one end to the radiation detector 1 and connected at the other end to an input of the metering instrument 2e; however, with respect to its outside conductor 200a as an shield, its side toward the radiation detector is left open but its side toward the metering instrument is connected to a line provided in a test-current generation unit 27d and having a potential that is the same as the potential of the signal input line. For example, the outside conductor 200a is connected to a connection terminal E of the second semiconductor switch 2156 in an electric-charge discharging unit 215c, which is connected to a reference potential in the test-current generation unit 27d that is the same as the potential of the signal input line. The other configuration is similar to in the radiation measurement device of Embodiment 4, so that its description is omitted here.

With this configuration, when the normal mode is selected, the potential at the connection terminal E of the second semiconductor switch 2156 to which the outside conductor 200a of the coaxial cable 200 is connected, also becomes the same as the potential at the input terminal A, so that it is possible to prevent a leakage current from intruding into a signal input line inside the coaxial cable 200, and to guard the detection current signal against an external noise.

As described above, in the radiation measurement device according to Embodiment 5 of the invention, the test-current generation unit 27d is provided and, even though the signal conversion unit 21e for converting the detection current signal into a rectangular-wave pulse signal is used, when the test mode 25t1 or 25t2 is selected, through the contact 2742 or 2752 inverted from "Open" to "Closed" in the first switching relay 274 or second switching relay 275 operating in response to that mode, a voltage resulting from adjusting the constant voltage to be stepped down using the high resistance connected to the signal input line is applied, so that the test current is introduced into the signal input line to be superimposed on the detection current signal;

whereas, when the normal mode is selected, with respect to the potential other than zero voltage and given by the offset-voltage adjusting power supply 2133, the constant voltage as an output of the constant voltage power supply 271 is adjusted to be stepped down, using the variable resistance 270 of the test-current generation unit 27$d$, to the reference potential that is the same as the potential of the signal input line, so that the test current is connected to a potential that is the same as the potential at the input terminal A of the signal line, so as to be diverted to the reference potential, and thus, each potential at the connection terminals B, C where the test current is interrupted at the time of the normal mode and the connection terminal E of the second semiconductor switch 2156 that is closed and to which the outside conductor 200$a$ of the coaxial cable 200 is connected, is fixed to that same potential, to thereby prevent a potential difference from occurring. Accordingly, even though the coaxial cable is used as the signal input line, it is possible not only to easily confirm the integrity of radiation monitoring by using the test current, but also to guard the detection current signal to thereby prevent leakage currents, including a leakage current of the coaxial cable 200$a$ toward the signal input line, from intruding thereinto. This makes it possible to perform more stable measurement with high accuracy even in a region of the range near the lower limit.

Furthermore, it is possible to guard the detection current signal against an external noise.

Embodiment 6

In Embodiment 1 and Embodiment 2, such cases have been described where power is always supplied to the test-current generation unit 27$a$, 27$b$ from the DC power supply 24, whereas, in Embodiment 6, such a case where the power is supplied in response to the test mode, will be described.

Figure 7:
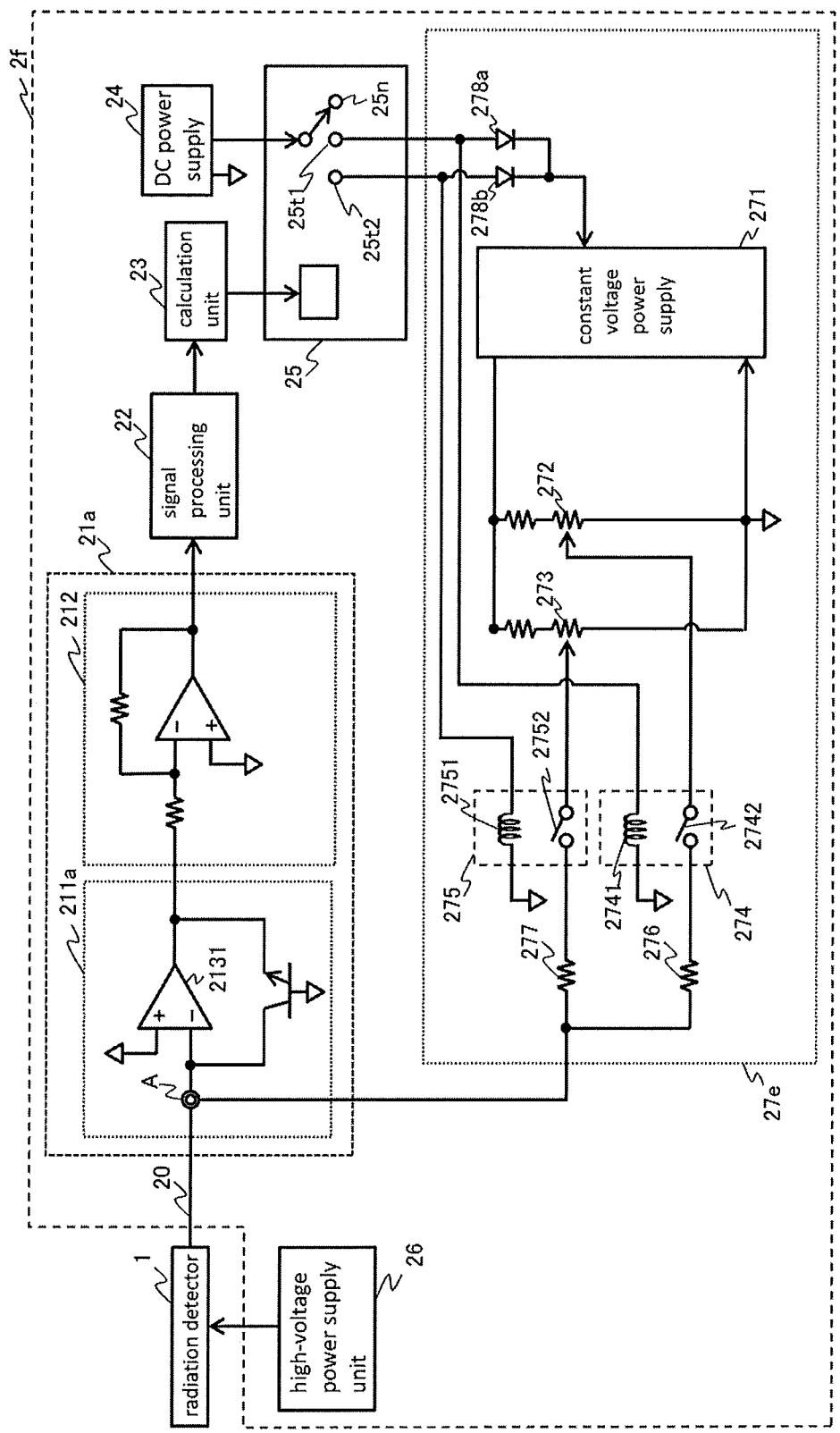
FIG. 7 is a circuit diagram showing a configuration of a radiation measurement device according to Embodiment 6 of the invention.

FIG. 7 is a diagram showing a configuration of a radiation measurement device according to Embodiment 6 of the invention. As shown in FIG. 7, in a metering instrument 2$f$, in response to the test mode, a voltage is supplied from the DC power supply 24 to the constant voltage power supply 271 in a test-current generation unit 27$e$ and thus, the test current is introduced into the signal input line 20, whereas, when the normal mode is selected, in response to that mode, the supply of the voltage from the DC power supply 24 to the constant voltage power supply 271 in the test-current generation unit 27$e$ is interrupted, to thereby interrupt the introduction of the test current into the signal input line 20. Because of the interruption of the supply of the voltage from the DC power supply 24, the output of the constant voltage power supply 271 is fixed to zero voltage, so that, in the contact 2742 of the first switching relay 274 and the contact 2752 of the second switching relay 275 that are made "Open" in the normal mode, their sides toward their variable resistances are fixed to zero voltage, to become the same in potential as zero voltage of the signal input line 20. The other configuration is similar to in the radiation measurement device of Embodiment 1, so that its description is omitted here.

With this configuration, when the normal mode is selected, it is possible, like in Embodiment 1, to guard from the test-current generation unit 27$e$, the signal line 20 to thereby prevent a leakage current from intruding thereinto. This makes it possible to perform stable measurement with high accuracy even in a region of the range near the lower limit.

As described above, in the radiation measurement device according to Embodiment 6 of the invention, the test-current generation unit 27$e$ is provided and, when the test mode 25$t$1 or 25$t$2 is selected, through the contact 2742 or 2752 inverted from "Open" to "Closed" in the first switching relay 274 or second switching relay 275 operating in response to that mode, a voltage resulting from adjusting the constant voltage to be stepped down using the high resistance connected to the signal input line 20 is applied, so that the test current is introduced into the signal input line 20 to be superimposed on the detection current signal;

whereas, when the normal mode is selected, the introduction of the test current is interrupted by the contact 2742 or 2752 inverted from "Closed" to "Open" in the first switching relay 274 or second switching relay 275 operating in response to that mode, and the supply of the voltage from the DC power supply 24 to the constant voltage power supply 271 in the test-current generation unit 27$e$ is interrupted also in response to that mode, so that, in the contacts 2742 and 2752 inverted to "Open", their sides toward the variable resistances are fixed to zero voltage of the signal input line 20, to thereby prevent a potential difference from occurring. Thus, it is possible not only to easily confirm the integrity of radiation monitoring by using the test current, but also to guard the detection current signal to thereby prevent a leakage current from intruding thereinto. This makes it possible to perform stable measurement with high accuracy even in a region of the range near the lower limit.

DESCRIPTION OF REFERENCE NUMERALS AND SIGNS

1: radiation detector, 2$a$, 2$b$, 2$c$, 2$d$, 2$e$, 2$f$: metering instrument, 20: signal input line, 21$a$, 21$b$, 21$c$, 21$d$, 21$e$: signal conversion unit, 22: signal processing unit, 23: calculation unit, 25: display/operation unit, 27$a$, 27$b$, 27$c$, 27$d$, 27$e$: test-current generation unit, 200: coaxial cable, 200$a$: outside conductor, 211$a$, 211$b$: log I/V conversion unit, 212: inverting amplifier, 213: electric-charge integration unit, 214: voltage-comparison/rectangular-wave-pulse-conversion unit.

The invention claimed is:
1. A radiation measurement device, comprising:
   a radiation detector that detects radiation to thereby output a detection current signal;
   a metering instrument that has: a signal converter for performing signal conversion of the detection current signal; a signal processor for processing a signal converted by the signal converter; a calculator for calculating an engineering value from a value processed by the signal processor; a selector which can operationally select a normal mode or a test mode; and a test-current generator for generating, when a DC voltage is supplied thereto from a power supply, a test current signal simulated for the detection current signal, and then inputting to the detection current signal, the test current signal to be superimposed thereon; and
   a signal input line that connects the radiation detector and the metering instrument to each other, and has an input terminal placed between the radiation detector and the metering instrument, for inputting from the test-current generator;
   wherein, when the test mode is operationally selected, the test current signal is superimposed on the detection current signal by the test-current generator, and then they are subjected to signal conversion by the signal converter, and when the normal mode is operationally selected, only the detection current signal is subjected to signal conversion by the signal converter; and wherein, when the normal mode is operationally selected, the test-current generator interrupts inputting of the test current signal from the test-current generator to the input terminal, and diverts the test current signal to a potential same as a potential at the input terminal.

2. The radiation measurement device of claim 1, wherein the signal converter has: a log I/V converter for importing the detection current signal to covert it into a voltage signal proportional to a logarithm of its current value; and an inverting amplifier for outputting the voltage signal while inverting and amplifying that signal.

3. The radiation measurement device of claim 1, wherein the signal converter has: an electric-charge integrator for importing the detection current signal to thereby integrate electric charges, and then converting the electric charges into a voltage that increases in proportion to the charges; a voltage-comparison/rectangular-wave-pulse converter for outputting a one-shot-like rectangular wave pulse when the voltage reaches a setup value; and an electric-charge discharger for discharging the electric charges integrated in the electric-charge integration unit during when the rectangular wave pulse is outputted.

4. The radiation measurement device of claim 3, wherein the signal input line is composed of a coaxial cable whose inside conductor connects the radiation detector and the metering instrument to each other and whose outside conductor is connected to the test-current generator, and, when the normal mode is operationally selected, the outside conductor of the coaxial cable is caused to have a potential that is the same as a potential at the input terminal of the test current signal, by way of the test-current generator.

\* \* \* \* \*